(12) United States Patent
Shu (10) Patent No.: US 10,975,970 B2
(45) Date of Patent: Apr. 13, 2021

(54) CROSSOVER ROTARY VALVES AND STEM SEAL PACKING

(71) Applicant: Jianchao Shu, Cypress, TX (US)

(72) Inventor: Jianchao Shu, Cypress, TX (US)

( * ) Notice: Subject to any disclaimer, the term of this patent is extended or adjusted under 35 U.S.C. 154(b) by 97 days.

(21) Appl. No.: 16/240,771

(22) Filed: Jan. 6, 2019

(65) Prior Publication Data

US 2019/0219175 A1 Jul. 18, 2019

Related U.S. Application Data

(60) Provisional application No. 62/617,272, filed on Jan. 14, 2018.

(51) Int. Cl.
| | |
|---|---|
| *F16K 1/226* | (2006.01) |
| *F16K 1/46* | (2006.01) |
| *F16K 31/53* | (2006.01) |
| *F16K 1/42* | (2006.01) |
| *F16K 25/00* | (2006.01) |
| *F16K 35/06* | (2006.01) |

(52) U.S. Cl.
CPC ............ *F16K 1/226* (2013.01); *F16K 1/2261* (2013.01); *F16K 1/2263* (2013.01); *F16K 1/2268* (2013.01); *F16K 1/42* (2013.01); *F16K 1/46* (2013.01); *F16K 1/465* (2013.01); *F16K 25/005* (2013.01); *F16K 31/53* (2013.01); *F16K 35/06* (2013.01)

(58) Field of Classification Search
CPC ...... F16K 1/226; F16K 1/2263; F16K 1/2268; F16K 1/465
USPC .......................................... 137/305, 306, 308
See application file for complete search history.

(56) References Cited

U.S. PATENT DOCUMENTS

2013/0056667 A1\* 3/2013 Shu ......................... F16K 1/224
251/305

\* cited by examiner

*Primary Examiner* — Paul J Gray (57) ABSTRACT

This invention relates to a novel crossover valve combined double offset and triple offset butterfly valves with metal seal ball valve, the valve has a novel stem seals and seat seals with various material combinations, metallic and nonmetallic, full metals with novel lock methods, safe and secured handle operator assembly particularly to rotary valves or all valve stem seals with those novel features used for on-off and flow fluid controlling in pipelines, offshore platform, marine/submarine, refiners, chemical plant, power plant and oilfields. Those valves can performance under multiple extreme conditions or in severe services; such as the rocket engine/turbine fuel control system with highly oxidative fluid under extreme temperature of 1600 F, or with liquidized oxygen or hydrogen down to −425° F., the valve stem seals is used in chlorine gas process with extremely low emission leakage under 10 ppmv.

8 Claims, 6 Drawing Sheets

CROSSOVER ROTARY VALVES AND STEM SEAL PACKING

CROSS-REFERENCE TO RELATED APPLICATION

This application claims the benefit of provisional patent application Ser. No. 62/617,272 filed on Jan. 14, 2018 by the present inventor.

FEDERALLY SPONSORED RESEARCH

No

SEQUENCE LISTING OR PROGRAM

No

BACKGROUND

This invention relates to a novel crossover valve combined double offset and triple offset butterfly valves with metal seal ball valve, the valve has a new stem seals and seat seals with various material combinations, metal and non-metal, full metals with novel lock methods, safe and secured handle operator assembly particularly to rotary valves or all valve stem seals with those novel features used for on-off and flow fluid controlling in rocket engines, pipelines, offshore platform, marine/submarine, refiners, chemical plant, power plant and oilfields. Those valves can performance under multiple extreme conditions or in severe services; such as the rocket engine/turbine fuel control system with highly oxidative fluid under extreme temperature of 1600 F, or with liquidized oxygen or hydrogen down to −423° F., the integrated gasification combined cycle (IGCC) under high temperature and pressure. platform, marine/submarine, refiners, chemical plant, power plant and oilfields, those applications also includes extremely long serve times from 10 to 50 years or extreme cycles with million without failure, the valve stem seals in chlorine gas process are required with extremely low emission leakage under 10 ppmv, finally fast shut off operation in pipeline valves are required with extreme speed of less than 1/10 to 2 second for emergency shut off, cut off valve for LNG terminal and HIPPS, rocket launch system with liquid oxygen and hydrogen valves.

This valve comprises a body with a flow port and a stem bore, a stem keyed with a disc is disposed in the stem bore to rotate the disc or ball between open and closed positions, this valve is fully metal sealed in the stem by a simple, reliable stem packing based on metal K ring and spring bearing and liquid seal in the port by a wedge seat ring assembly. The wedge seal seat assemblies have simple base structures with versatile configurations for various applications and are easy for manufacturing and repair, yet robust and reliable.

Conventional valves have been divided into three categories in terms of seat material and sealing mechanism; the solid metal to solid metal seal (hard seal) and the metal to nonmetal seal (soft seal) and solid metal to flexible metal seal (firm seal), since early 1950 after synthetic rubber and engineered plastics were developed, greatly number of soft seal valves are developed for low leakage requirements like butterfly, ball valves, there have been many specifications for seat leakage like ANSI FCI 70-2 for control valves, Class V and VI are considered as bubble tight, ISO 5235, MSS-61, but today the flow control industries are faced with more and more challenges with extreme temperature, pressure, fluid content and operation conditions, only one kind of seats no longer can solve high demanding problems, the hard seals are early developed for gate valves and check valve and stronger than the metal to soft seals in high pressure and high temperature conditions, but they not only have leakage problems and other many unsolved problems (a) for example, some float ball valves with the hardened facing meet class VI, but the hardened facing not only add high cost, but also increase operation torque as well as cost greatly (b) the triple offset butterfly valves with laminated seat meet ANSI class VI leakage under a new condition, but once the seat is used and can be easily damaged either by high velocity flow or operation friction or the melted adhesive between metal ring and graphite ring or graphite ring torn off between metal rings under high temperatures or compression (c) the hard seal seat is required with highly preload to secure seals between the seat and disc or ball at lower pressure and cannot stand for closing impact between the valve closure member and valve seat due to high impact and can cause spark, so they cannot used for fast shutoff or high cycle operations, in case of rocket engine, they can be used for controlling liquefied oxygen or hydrogen, moreover the most the failures are the seal surfaces wearing which includes abrasive wearing, adhesive and fatigue wearing beside erosive wear interaction between solid and fluid, finally hard seat is not field repairable (d) while the soft seats can stand for high impact as the closure member hit the seat, but the soft seat can be torn off fast especially in high temperature and cryogenic service like double offset butterfly valve and ball valves, even double offset butterfly valves with metal ring support, the metal ring alone cannot hold bubble tight seal in most cases, moreover the soft seal materials greatly reduce the valve usage for an example, according to API 609, the whole valve pressure ratings with PTFE and RPTFE are degraded by 30 to 60% under high temperature (e) axial bolting joint between retaining ring and seat ring for ID and side surface seal mechanism like most offset butterfly and ball valves, those joint devices are equipped with direct screws or sleeve to secure seal rings, such a method not only produces uneven pressing forces on seal rings and seats, but also has a lower reliability with multiple bolting and high probability of screws or bolts falling into downstream under vibration or high cycle conditions, according to Failure Modes and Effects Analysis (FMEA), such a structure has the highest severity in high vibration, high temperature applications like turbine or jet engine systems, a risk of bolts falling in a pipeline system is very high due to vibration, quick cycle and high temperature creep (f) unidirectional seal, although many offset butterfly valve or single seat ball valve makers claim that their valves are bidirectional, in fact the upstream seal is tended to move the seat away from the body seal ring, moreover there are cumulative clearances between bearing inside diameter and stem, stem and disc hub, body bearing hole and bearing outside diameter, sometime after sudden closing, the valves start to leak due to the clearances, so the current solution is to tight the clearances, as a result, stem will tend to gall with bearing under high temperature or thermal cycle, in short those problems greatly reduce potential usage of the offset butterfly valve or single seat ball valve and prevent them from getting more market share so far there is no good solution.

While stem seal leakage have been neglected for long time, until the Clean air Act was passed in 1970, but today more than 95% valves in the use still have stem leakage between 100 to 500 ppmv, the specifications for stem fugitive emission are established under API 622 for stem packing, API 624 for rising stem valve and API 641 for part-turn valve, the stem leakage becomes more and more sensitive and important issues for the society as well the industries, EPA is a US gent to reinforce under Clean air Act, while the stem packing with PTFE and engineered plastics have lower leakage less than 100 ppmv only under 400 F temperature, while the graphite stem packing become main packing materials after asbestos were banned due to health risk in 1970s, but the graphite stem packing even with live-loaded device not only have high leakage between 100 to 500 ppmv, but also have high, uncontrolled packing torques, a few packing sets passed under fugitive emission specifications with less 100 ppmv, but they fails in the real applications and cannot meet the consent decreed issued by EPA, since the Poisson ratio of graphite is near zero, the load on graphite are proportional to density of graphite, the excessive packing force is need to provide stem seal with constant readjustment or replacement of packing, the actuation forces are unpredictable, while most graphite packing assemblies have a five set ring assembly, but only top three set rings have sealing function about 50%, 30% 20% affectedness, the packing mechanism is very inefficient due to low Poisson ratio near zero, in other words, any vertical displacement would generate a little radial displacements, so it is difficult to automate, in case of subsea flow devices or nuclear power plants, remote pipelines, the constant readjustment is impracticable, so far no prior arts ever clearly defines or understands real cause, the applicant's research has shown there are four causes for stem packing leakage (1) the stem dynamic enlargement account for 45% of stem leak failures due to misalignment between stem axis and packing axis during stem moving (2) stem wearing accounts for about 30% of stem leak failures due to friction between stem and packing (3) Corrosion accounts for about 20% of stem leak failures due to galvanized corrosion between noble graphite and less noble metal (4) foreign object inclusion accounts for 5% of stem leak failures, so far there is no real good solutions.

70% of all valves are manually operated, especially in HVAC system, refiner, power plants, oilfield, ship, submarine, offshore platform, 30% of automated valves are equipped with manual override devices, 99% of pipeline valves are manually operated at the testing stage, most manual valves have no clear sign devices to indicate the operation conditions, but the safety and security issues for the manual operation device have been neglected for long time, the safety and security become more important for the operators as well as the society and environment protection, there is no good solution so far for safe and secured handle with a good interface between human and the valves and anti-tampering device, even after many accidents happened and millions dollar lost.

Finally large numbers of the butterfly valves are used for burner or gas turbine exhaust dampening control, but most of them are used for releasing harmful gas into the air, like carbon monoxide, NOx, EPA and may states have regulations for vehicle emissions, but more and more states passed the laws for furnace and power generators emissions control.

In order to overcome the disadvantages or solve the problems of the conventional butterfly valves and ball valves or valve stems, many efforts have been made in the prior arts. The efforts in five fields were made to improve the conventional valves in the prior arts, but those works within a limited scope.

The first field is for improving the seat seal, many efforts were made, especially in metal to metal seat seal in high temperature, cryogenic environments or for highly abrasive or erosive fluid applications. Most prior arts are shown in U.S. Pat. Nos. 9,022,348, 5,145,150A to Robert T. Brooks shows a typical ball valve has single metal to metal seat, but it cannot seal under Class VI, still there are some practice issues to be solved like how to assemble and secure the seat or seal ring with disc, ball, plug or body, how to deal with or minimize closing impact on metal seat, how to improve the laminated seal ring for triple offset butterfly valve, how to improve soft seat for double offset butterfly valve and ball valve, how to improve hardfacing, which are used for most ball valve, butterfly valve, gate valve, or replace hardfacing with other method, so far there is no good solution.

The second field is for improving the stem seal packing, most prior arts are shown in U.S. Pat. No. 9,022,348, a recent study shows stem bearing and stem sealing are related to each other, the bad stem bearing cause bad stem sealing and vice, versa, most stem operation problem are either stem sealing or stem bearing problems, so stem seal issue should be dealt with both sealing and bearing, moreover most stem seals in the market are equipped with graphite and PTFE, major problem for graphite is required to readjust the packing constantly due to lack of elastic of graphite, major problem for PTFE packing is the temperature limitation up to 400 F, finally stem fugitive emission is a main issue for operators, industries, the society and the planet, so far there is no good solution.

The third field is for improving the joint between the seat and the main parts like ball, gate, disc plug or body, most prior arts are shown in U.S. Pat. No. 9,022,348, the foundational issue for hard seal is a joint method between the base parts like ball, disc, gate, plug or body and hardened materials like stellite 21 or 6, tungsten carbide, and chrome carbide by hot joint methods like welding, HVOF, hardfacing or cool joint method (mechanical joint) like screw, glue, and pin, retaining ring or eccentric plug/lock ring. Most prior arts in mechanical joint are shown in U.S. Pat. No. 233,444, some hot joint methods in valve industries are shown on U.S. Pat. Nos. 6,117,493; 6,326,582; and 6,582, 126, but there are still some issues to be solved like cost, the environment protection, and manufacturing, field repair, reliability and inspection methods.

The fourth field is to improve handle performance; the conventional valve handle with a positioner was shown in U.S. Pat. No. 4,815,693 to James et al (1989), the handle is not detachable from the valve and occupy large operation space to operate even butterfly valve is very compact, U.S. Pat. No. 5,598,724A shows valve handle with safety lock, it is an add-on device, the lock device not only add cost but also make the positioner less visible, in short all lock screws between the valves and positioners can be removed easily, all existing butterfly valve and some ball valve handles are not detachable and fully tampering-proof design, especially the handles which occupy too large operation space cause big problem in very limited working spaces, especially like ships, submarines, offshore planform, some places in power plant and refiners, finally the manual operated valves have no visible sign for operating condition like "open", "closed", "high pressure zone" in many emergence cases, it is difficult that only in few seconds, the operators should decide which valve should be opened, which valve should be closed from distances, any mistake can cause life and dollars loss, so far there is no good solution.

In short, all efforts in the prior arts never address or recognize needs for replacing the axial retaining ring bolting or the laminated seat with metal and graphite stem seal and for developing buckling metal seat instead of improving spring assistant seal force and wedge ring to help stem seal instead of live loading under high temperature and greatly reducing the operation torque, most efforts are focused on easing the consequence rather than finding the root of cause, finally other inherent problem for butterfly valve is the upstream load is supported by the stem rather than the seat and body like ball valve or gate valve, it causes unidirectional seal in most of the offset butterfly valves if the stem is not properly constructed, finally stem fugitive emission for all valve still is a mystery for most packing and valve manufactures.

So the flow control industry has long sought means of improving the performance of butterfly as well as rotary valve, improving the stem seal, creating a robust bidirectional seat seal, enabling the valve to handle various flows under multiple extreme conditions with safe and secured handle.

In conclusion, insofar as I am aware, no such butterfly or such rotary valve is formerly developed with versatilely, reliably sealed seats, highly reliable seat retaining device without high preload and risk of bolt and reliable stem seals with less than 50 ppmv, easy manufacturing at low cost they can be used for controlling bidirectional fluid and operated securely and safety to operators, the society and the planet even under multiple extreme conditions.

SUMMARY

This invention provides a simple, robust, reliable and versatile crossover rotary valve; combining double offset and triple offset butterfly valves with ball valve for severe service or under multiple extreme conditions. This valve comprises a body with a flow port, a reliable, robust wedge—thread joint/lock mechanism between a stem and a closure member in a middle is provided with two wedge keys and secured by a setscrew for providing solid joint without reducing of stem strength and loss motion, the stem is disposed by means of two sealed spring bearings in the body, spring pins are disposed in slots of the sealed spring bearing to compensate valve assembly clearances for upstream seal as well as the thermal expansion of the stem and provide liquid seals between the sealed spring bearing with special grease, the conical sold seat assembly is disposed in conical mating surface of the disc or the body for providing inward surface and outward surface seals, the solid seat assembly is secured by a wedge-spring plug join/lock mechanism, which includes three noon shape grooves to extending to three plug holes on the closure member respectively to receive spring lock ring assemblies between the disc and the solid seat assembly.

The wedged seal ring assembly disposed in a conical counter bore of the body or the closure member for providing inward and outward surface seals, the wedged seal ring assembly is secured by a wedge-spring plug join/lock mechanism, which includes a groove with a conical surface on the body and a retaining ring assembly, the retaining ring assembly has a retaining ring with three noon shape grooves to extending to three plug holes respectively to receive three spring lock ring assemblies between the retaining ring and the groove in the body, three setscrew inserted in three radial thread holes in the retaining ring into the groove against the conical surface. The plugs are disposed in the plug holes of the disc, each lock plug has squared bar to receive a set of spring washers with slots as well push the lock ring bottom up against wedge surfaces of the retaining ring by rotating the plug, in turn, the wedge lock ring is engaged with wedge surface of groove on the retaining ring is provided for pressing the wave seats, finally three setscrews are respectively disposed in a thread hole in retaining to prevent the lock plug from rotation. A novel stem packing ring assembly based on wedge ring design comprises an external ring, metal wedge ring and internal ring, with metal V support ring for converting dynamic axial seal forces to dynamic radial forces to help seals and reach the leakage between 5-50 ppm, even under high temperature and high pressure or high cycle's conditions.

This rotary valve can be constructed with a closure member assembly with a pair of right and left segment trims can be used for both ball valve and butterfly valve disposed between two ends of the flow port on the rotary valve body for providing catalytic converting, flitting functions, beside cavitation or noise reductions, the trim comprises a segment of cylinder bar with multiple holes.

This valve body can be constructed with a wedge stem packing assembly, so the stem packing assembly can provide live load for converting dynamic axial loads to radial seal forces without external disc springs and bolts, the self-energized stem packing assembly first is aim at the heat of stem fugitive emission problem, the wedge metal and metal v support is the soul of the stem packing assembly and dive the packing to four sections, (1) internal ring is designed for dynamical seals for dynamic seal against moving stem, while external ring is used for static seal against the packing bore of valve body, while the metal wedge ring and metal V support ring are used for converting dynamic axial forces efficiently to radial seal forces and holding pressures behind each nonmetal packings, each engineering plastics or expandable graphite, such stem packing assembly can be used for both rotary and rising stem.

Finally the valve includes secured and safety handle operator assembly, the handle operator assembly includes a position assembly, sign indicator, detachable handle assembly and an anti-tamping double position locking assembly.

Accordingly, besides objects and advantages of the present invention described in the above patent, several objects and advantages of the present invention are: (a) To provide simple highly sealable, reliable, durable seat seal assembly for multiple extreme conditions, so such a seal seat assembly can keep good static and dynamic seals with low leakage under Class VI and VII with low friction and operating torque without high preload and side seal and provide a bidirectional seat seal at the same working pressure and absorb closing impact force with damaging the seat (b) To provide a highly reliable joint/lock mechanism for seat assembly, so such a valve can be operated under high vibration and high temperature condition without risk of bolts falling into a pipeline system to damage critical equipment in the downstream and filed repair (c) To provide a stem seal for extreme conditions: high pressure, cryogenic or high temperature or fire-safe applications with external disc spring and bolts. Such a seal ring can keep good static and dynamic seals with low leakage between 5-50 ppm with low friction without constant repacking or readjustment. (d) To provide a valve with sealed stem bearings and liquid seals to support a stem under high temperature, high thermal cycle and high pressure, compensate an assembly clearance and thermal expansion, or deformation under high pressure with liquid seal as well. (h) To provide a simple, compact and safe and secured valve with a manual operator for easy manufacturing, operation, installation, repairing and maintenance, so the valve becomes much greener to reduce waste, energy consumption and improve the environments.

Accordingly, besides objects and advantages of the present invention described in the above patent, several objects and advantages of the present invention are Still further objects and advantages will become apparent from study of the following description and the accompanying drawings.

DRAWINGS

Drawing Figures

DESCRIPTION

FIGS. 1-8 illustrate a handled rotary valve constructed in accordance with the present invention. The handled valve 10 has a bare stem valve 100 and a handle operator 200, the valve 100 comprises a body assembly 101, a closure member assembly 119, a solid seat 134 and a wedged seal ring assembly 160, the wedged seal ring assembly 160 disposed in the body assembly 101 is engaged with the solid seat assembly 134 disposed in the closure member assembly 119 for providing seals and controlling flow in a flow port 103, the body assembly 101 has a stem packing assembly 140, three seal bearing assemblies 180, a packing bore 102 extended to a stem hole 106 respectively to receive the stem packing assembly 140 and seal bearing assemblies 180, the closure member assembly 119 includes a disc 130 and a stem 120 disposed in the stem hole 106 by means of three seal bearing assemblies 180, the flow port 103 is divided into an upstream portion 103' and downstream portion 103" by the disc 130, the handle operator 200 has a handle positioner assembly 230 and a detachable handle assembly 201 coupled with the stem 120 for controlling the closure member assembly 119 between 0-90 degree.

Referring FIGS. 2-11, the stem 120 includes a shoulder 122, while the stem packing assembly 140 receiving the stem 120 comprise a stem bearing assembly 125, three stem packing ring assemblies 141 with two support rings 144, two shoulder packing ring assembles 141' with two support rings 145 to provide stem seals, the shoulder 122 is sandwiched by two shoulder packing ring assembly 141', the shoulder packing ring assembles 141' are sandwiched by three stem packing ring assemblies 141, each of stem packing ring assemblies 141 includes an external non-metal ring 142 against packing bore 102, an internal nonmetal ring 144 against the stem 120, a wedged metal ring 143 with an angle between 0-90 degree placed between a mated surface of the internal ring 144 and a mated surface of external ring 142 for providing solid axial forces converting to radial sealing forces against internal rings 142 and external ring 142 for holding pressure and providing seals as a spring, a metal support ring 145 is placed on each side of the packing ring assemblies 141,141' for generating axial reaction forces with the wedge ring 143 and generating equal radial sealing forces, the body assembly 101 has a groove 107 to receive a retaining ring 115 for securing stem packing assembly 140, the stem bearing assembly 125 has a stem bearing 126 having four slots 129 on internal surface 128 respectively to receive four spring pins 124 to position the stem 120 at a center position, two setscrews 114 threaded in body 101 engaged respectively with two conical holes 127 of stem bearing 126 to adjust and position the stem packing assembly 140, the seal body bearing assembly 180 has a body bearing 187 having multiple teeth 181 on internal surface 186 for holding and sealing stem 130 tightly with sealing greases and four slots 182 respectively to receive four spring pins 183 against the stem 120 and a groove 185 to receive a seal ring 184 for providing seals between body hole 106 and the bearing 187, a cavity 189 is defined by two seal bearing assemblies 180 and the hole 106 and filled with grease for providing liquid seals around the stem 120, the stem 120 is coupled with the disc 130 by means of two wedge keys 191, each of keys 191 has a thread hole 192 extending to a small driving hole 193, a setscrew 190 is inserted into thread hole 192 by tightening down the setscrew 190 to eliminate clearances between stem 120 and disc 130 from the small hole 193 and further penetrate into keyways of disc 130 for preventing up and down moments between the disc 130 and stem 120, while allowing thermal expansion from the center location, a buckling pin 109 with a groove 110 is placed in a hole 108 of the body 101 for preventing disc 130 from over travel and absorbing impact force at a buckling condition when the disc 130 approaches to a closed position and hit the pin 109.

Referring FIGS. 11 to 19, the body assembly 101 has a counter bore 110 extending to a conical counter bore 115 and a groove 111 defined by conical surface 112 on the counter bore 110, a wedged seal ring assembly 160 disposed in the conical counter bore 115, and a retaining ring assembly 177 disposed in the counter bore 110 for securing the wedge seal ring assembly 160, the solid seat 134 disposed in the disc 130 is engaged with the wedge seal ring assembly 160 for providing seals between the body assembly 101 and closure member assembly 119 at closed positions and three lock plug assemblies 146 disposed between the disc 130 and the solid seat 134 for securing joints between the solid seat 134 and the disc 130, the disc 130 has three plug holes 133 respectively extending to a slot 131 to receive the lock plug assembly 146 and a conical step bore 132, the solid seal seat 134 has a mated surface 135 engaged with bore 132 and a groove 136 defined by a conical surface 137, the lock plug assembly 146 disposed in plug hole 133 has a plug 147 and a set of spring washers 150, the plug 147 has two side slots 149 and a driver slot 148, each of set spring rings 150 has a notch 151 extending to two lips 152 to hold the plug 147 by means of side slots 149, the lock plug assembly 147 is rotated against the conical surface 137 by the spring washers 150 to push the solid seal seat 134 against the conical surface 132 for providing seals between disc 130 and the solid seal seat 134 and securing the solid seal seat 134, the wedged seal ring assembly 160 has a mated surface engaged with the counter bore 115 and a mated surface engaged with a sealing surface 138 of solid seal seat 134 for providing seals between the body assembly 101 and the closures member assembly 119, the wedged seal ring assembly 160 has a front seat ring 161, a middle ring 166 and a back ring 167, the front seat ring 161 has a lip 162 and a leg 163 against the retaining ring assembly 177 for absorbing impact force of disc 130, generating axial displacements when pressures on side of portion 103' and compensating a gap 199 between solid seat 134 and the wedged seal ring assembly 160 when pressures on the portion 103" and creating equal bidirectional seals, a back ring 167 has a groove 168 to receive a sealing ring 197 or generate spring function for providing second seals between the wedged seal ring assembly 160 and the conical counter bore 115 and absorbing impact force of disc 130, the middle ring 166 is used for maintaining seals between the body assembly 101 and the closure member assembly 118 even under water hammer or thermal shock due to sudden temperature changes, the body retaining ring assembly 176 disposed in the counter bore 110 against the wedged seal ring assembly 160 has a retaining ring 170, three setscrews 175 and three lock plug assemblies 147, the retaining ring 170 has three plug holes 172 respectively extending to three slots 171 and three thread holes 173 respectively extending the smaller hole 174, each of setscrews 175 inserted into thread hole 173 into groove 111 against conical surface 112 to secure the wedged seal seat assembly 160, the retaining ring 177 has a step 176 to generate a gap 199 between the wedged seal seat assembly 160 and retaining ring 170 to receive axial displacements of font seal ring 161 when pressures on the portion 103' and allow pressures to assistant the wedged seal ring assembly 160 against the solid seal seat 134 and the axial displacements of front seal ring 161 to compensate displacements of solid seat 134 when pressure is on portion 103", the lock plug assembly 146 has the plug 147 disposed in the hole 172 and a set of spring washers 150 inserted into the slot 171 and engaged with plug 147, the spring washers 150 is retreated as lock plug assembly 146' is rotated, so the lock plug assembly 147 in the retaining ring assembly 177 is rotated into the groove 111 against the conical surface 112 to push the wedged seal seat assembly 160 against the bore 115 and secure seals between wedged seal seat assembly 160 and bore 115.

Referring FIGS. 20 to 27, an alternative bare stem valve 100a has the stem 120 without the shoulder 122, a stem packing assembly 140a disposed in the bore 102 for providing seals between the stem 120 and the body 101, the stem packing assembly 140a has a set of five packing rings 141 and a set of five "V" support ring 145' and the stem bearing assembly 125, the V support ring 145' is provided with a metal to metal seals (line seals) between the stem 120 and bore 102 as a spring, especially for high temperature over 800 F due to thermal expansion, it hold the stem 120 at a ambient temperature as well as at elevated temperatures, the setscrew 114 in the body 101 is placed to hold and adjust the stem packing assembly 140a, the retaining ring 115 in the groove 107 is placed to secure the stem packing assembly 140a under pressures, an alternative hydride wedged seal seat assembly 160a has a front nonmetal ring 1601a, a middle metal ring 166a and a back nonmetal ring 167a, the front ring has a lip 162a and a leg 163a, the metal ring has a tilt angle between 0-90 degree, the valve 100a has an alternative laminated wedge sealing seat assembly 160b, the laminated wedge seal ring assembly 160b has a front metal ring 161b, a middle metal ring 161b' and a back metal ring 161b", two external graphite rings 167b, 167b' are placed in both sides of the middle ring 161b', two internal graphite rings 166b',166b are placed in both sides of the middle ring 161b', glues 164b are placed among rings 161b,167b and 166b as well as among rings 161b,167b and 166b for providing a strong metal to metal joint and a flexible metal to graphite joint instead of metal-graphite-metal joint like most triple offset butterfly valve laminated seats.

Referring FIGS. 28 to 32, an alternative bare stem valve 100b has a body assembly 101b, a disc 130b, a solid seat assembly 118b disposed on the body assembly 101b, a wedged seal seat assembly 160c disposed on the disc 130b, a retaining ring assembly 177b to secure wedge seal seat assembly 160c, the body assembly 101b has a conical bore 115b, a groove 111b and three lock plug holes 114b respectively extending to slots 110b, a solid seat 134b and three lock plug assemblies 146, solid seat 134b has a conical surface 135b engaged with bore 115b and a groove 136b defined by a conical surface 137b and a groove 138b to receive a gasket 198b for providing seals between the solid seat and the body assembly 101b, lock plug assembly 146 disposed in the hole 114b and slot 110b has the spring washers 150 into groove 136b against the conical surface 137b to push the solid seat 134b against the conical bore 115b for providing seals and securing positions of solid seat assembly 134b, the disc 130b has three lock plug holes 133b respectively extending to slots 139b, a cylindrical step 132b extending to a conical step 131b, the wedged seal seat assembly 160c has a mated surface engaged with the conical surface 131b of disc 130b, the wedged seal seat assembly 160c having a front ring 161c with a lip 162c and a leg 163c and a middle ring 166c and a back ring 167c is placed in the conical step bore 131b for providing seals between body assembly 101b and disc 130b, while the retaining ring assembly 177b has a retaining ring 170b with a step 176b, three lock plug assemblies 147 respectively disposed in the plug hole 133b, each of lock plug assemblies 147 has a slot 139b and a set of spring washers 150 into groove 136b' against the conical surface 137b' to push the retaining ring assembly 177b against the wedged seal seat assembly 160c for providing seals between the disc 130b and wedged seal ring assembly 160c.

Figure 1:
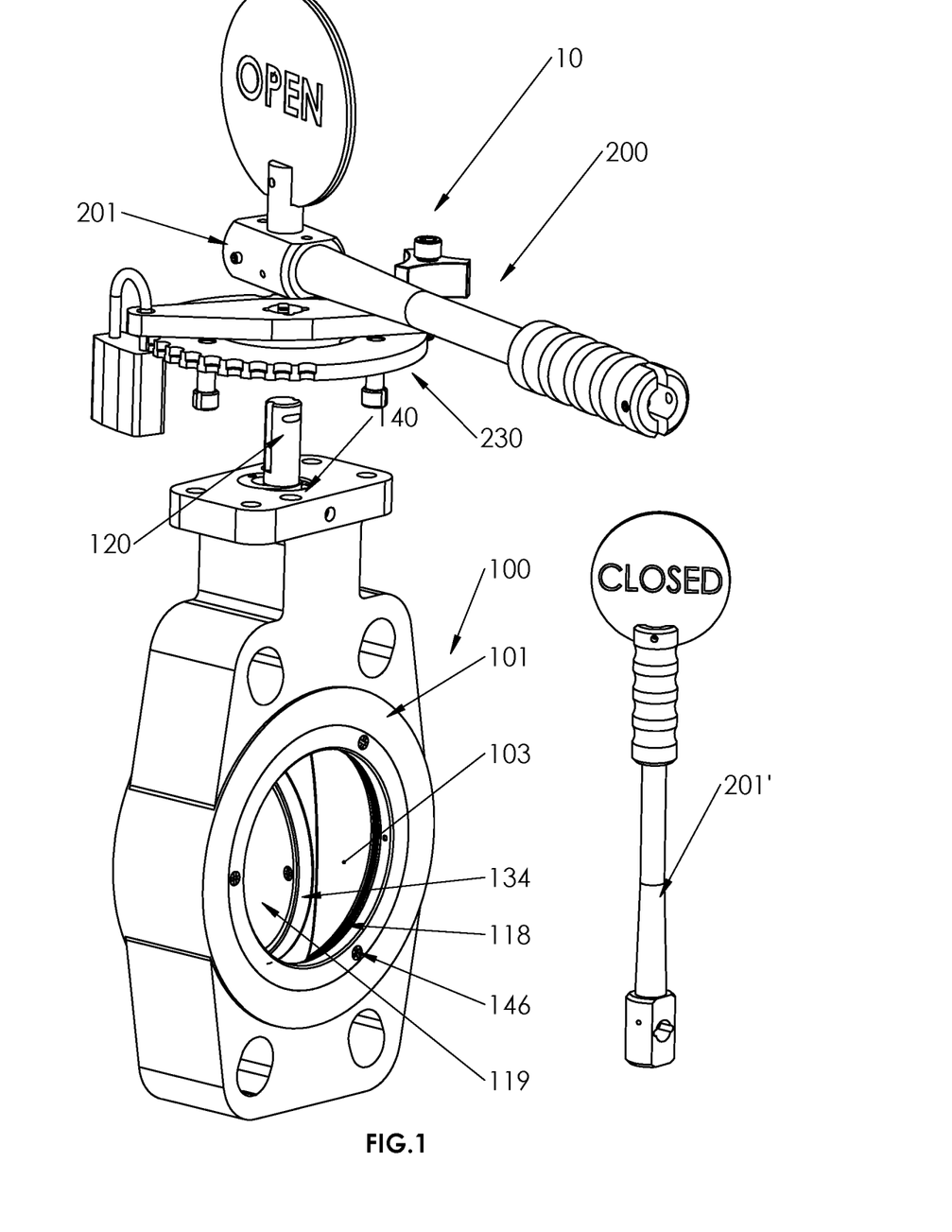
FIG. 1 is an exploded view of a handled rotary valve constructed in accordance with this invention.
Figure 2:
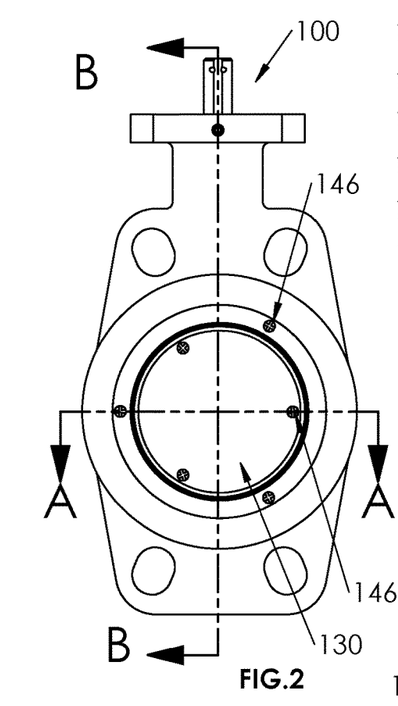
FIG. 2 is a front view of a bare stem rotary valve of FIG. 1.
Figure 3:
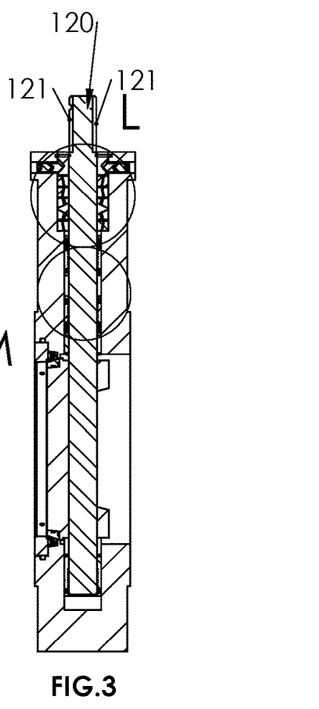
FIG. 3 is a cross sectional view of the rotary valve of FIG. 2 along line B-B.
Figure 4:
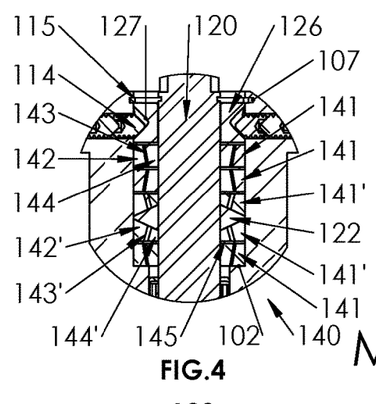
FIG. 4 is a "L" detail view of the rotary valve of FIG. 3
Figure 5:
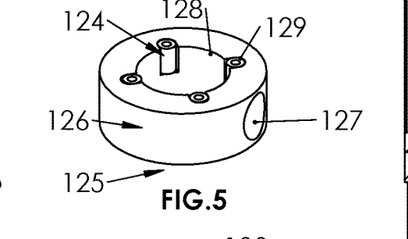
FIG. 5 is an isometric view of a stem bearing assembly of FIG. 4
Figure 6:
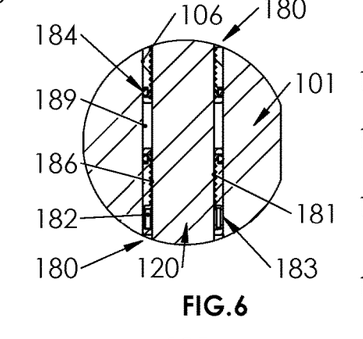
FIG. 6 is a "M" detail view of the rotary valve of FIG. 3
Figure 7:
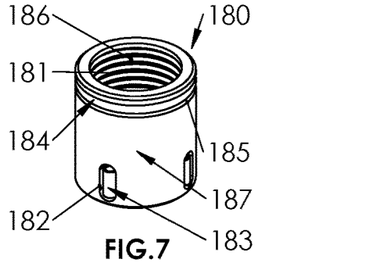
FIG. 7 is an isometric view of a body seal bearing assembly of FIG. 6
Figure 8:
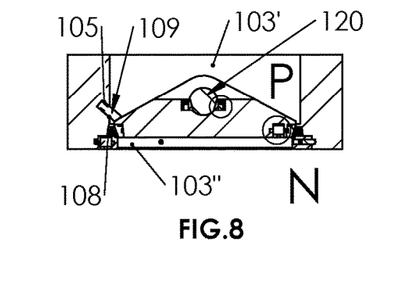
FIG. 8 is a cross sectional views of the rotary valve of FIG. 2 along line A-A.
Figures 9, 10:
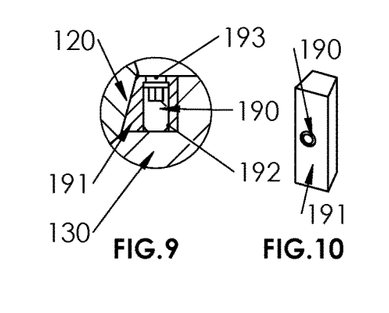
FIG. 9 is a "P" detail views of the rotary valve of FIG. 8
FIG. 10 is an isometric view of a setscrew/key assembly of FIG. 9.
Figure 11:
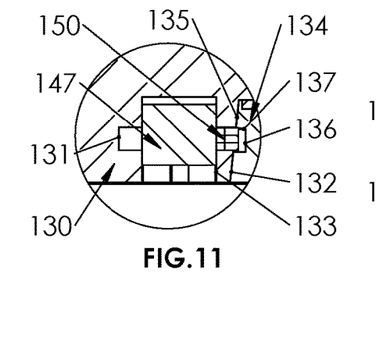
FIG. 11 is a "N" detail view of the rotary valve of FIG. 8.
Figure 12:
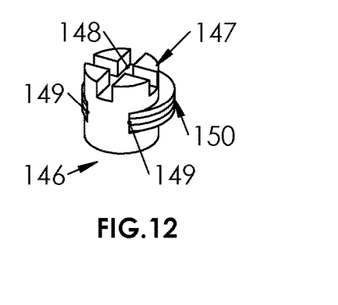
FIG. 12 is an isometric view of a lock plug assembly of FIG. 11.
Figure 13:
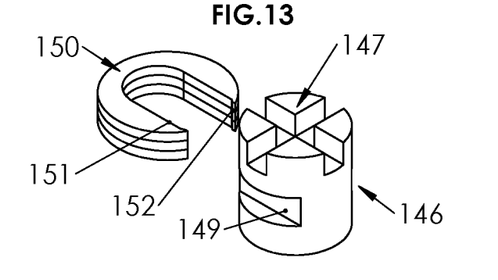
FIG. 13 is an explode view of the lock plug assembly of FIG. 12
Figure 14:
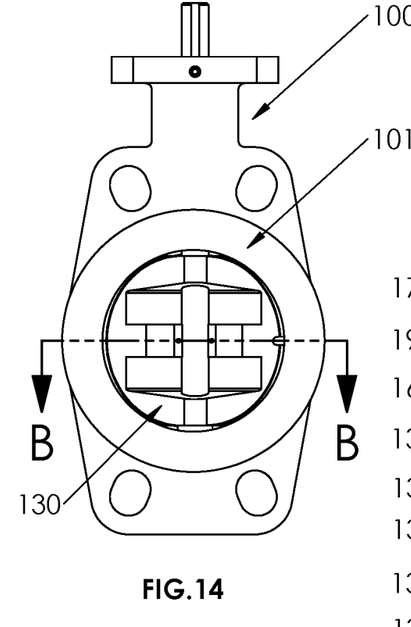
FIG. 14 is a back view of the bare stem rotary valve of FIG. 1.
Figure 15:
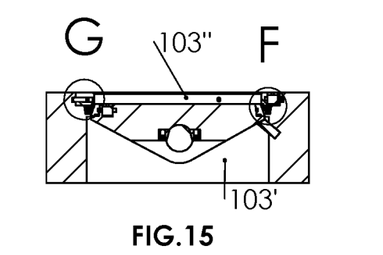
FIG. 15 is a cross sectional views of the rotary valve of FIG. 14 along line B-B.
Figure 16:
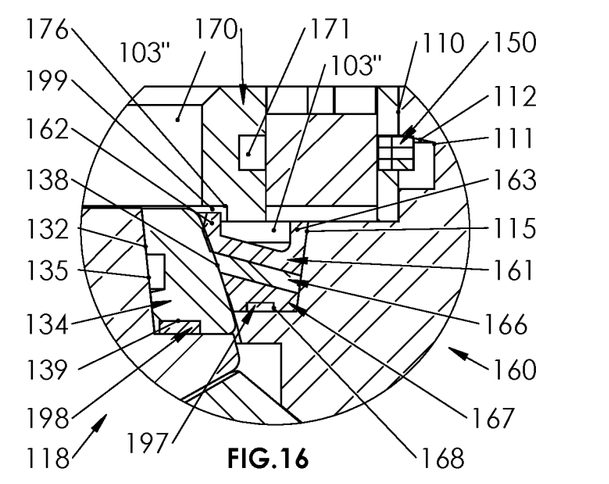
FIG. 16 is a "F" detail view of the rotary valve of FIG. 15.
Figure 17:
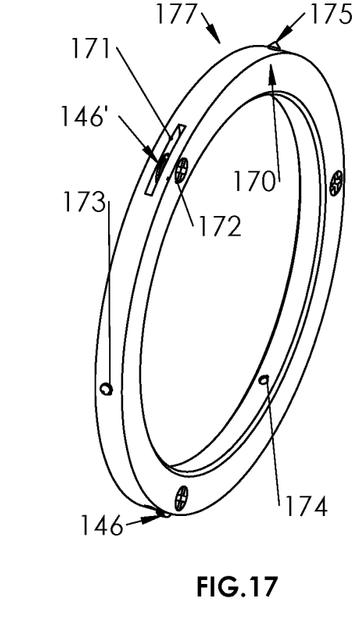
FIG. 17 is an isometric view of a retaining ring assembly of FIG. 16.
Figure 18:
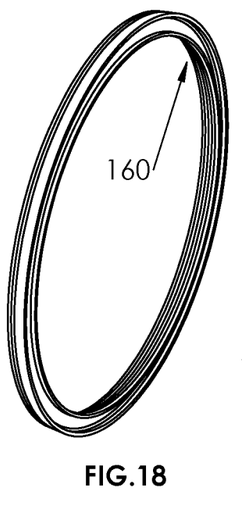
FIG. 18 is an isometric view of a seat ring assembly of FIG. 16.
Figure 19:
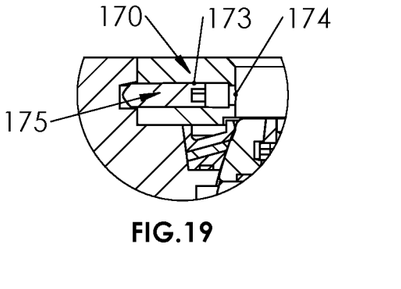
FIG. 19 is a "G" detail view of the rotary valve of FIG. 15.
Figures 20, 21:
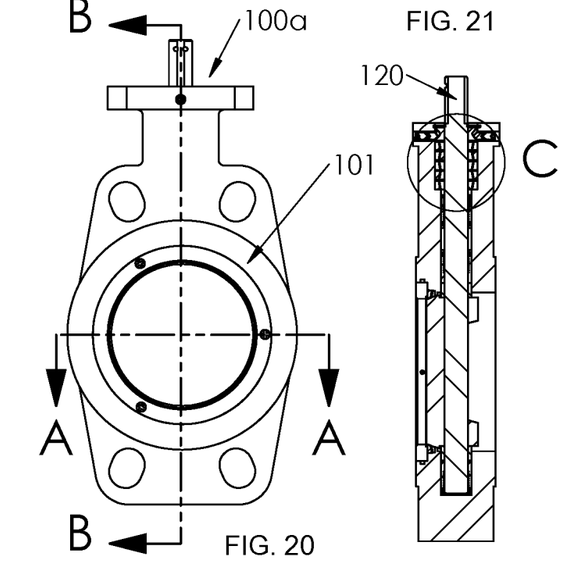
FIG. 20 is a front view of an alternative bare stem rotary valve of FIG. 2
FIG. 21 is a cross sectional views of the rotary valve of FIG. 20 along line B-B
Figure 22:
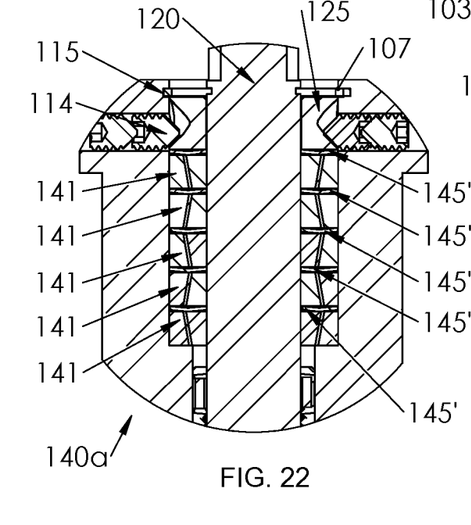
FIG. 22 is a "C" detail view of the rotary valve of FIG. 21.
Figure 23:
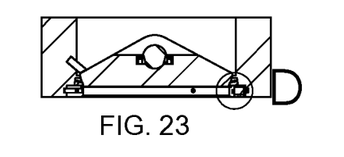
FIG. 23 is a cross sectional views of the rotary valve of FIG. 20 along line A-A
Figure 24:
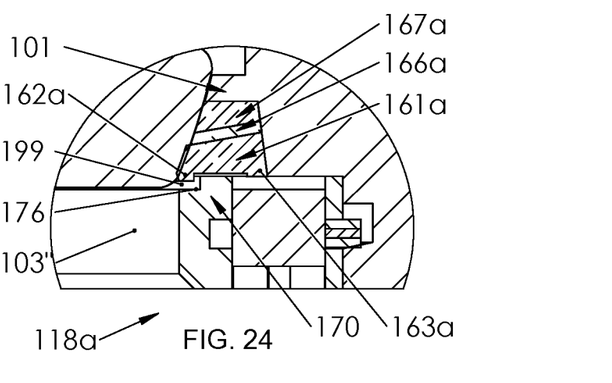
FIG. 24 is a "D" detail view of the rotary valve of FIG. 23.
Figures 25, 26:
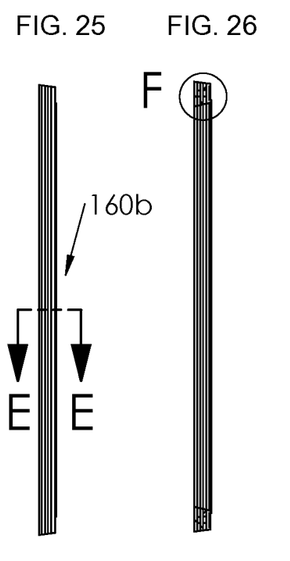
FIG. 25 is a front view of alternative wedged seal ring assembly of FIG. 20
FIG. 26 is a cross sectional view of the wedged seal ring assembly of FIG. 25 along line E-E.
Figure 27:
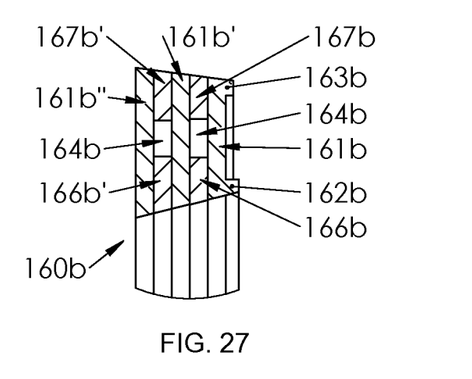
FIG. 27 is a "F" detail view of wedged seal ring assembly of FIG. 26.
Figure 28:
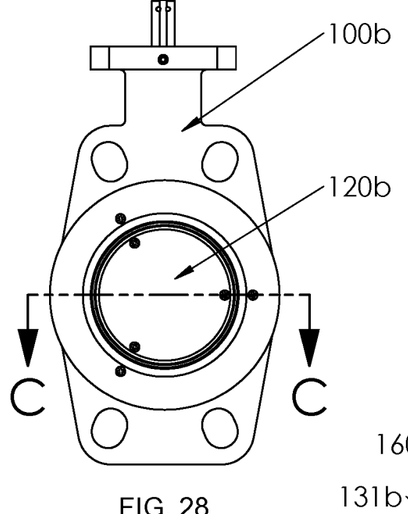
FIG. 28 is a front view of alternative bare stem rotary valve of FIG. 2.
Figure 29:
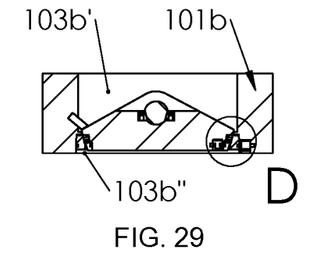
FIG. 29 is a cross sectional views of the rotary valve of FIG. 28 along line C-C
Figure 30:
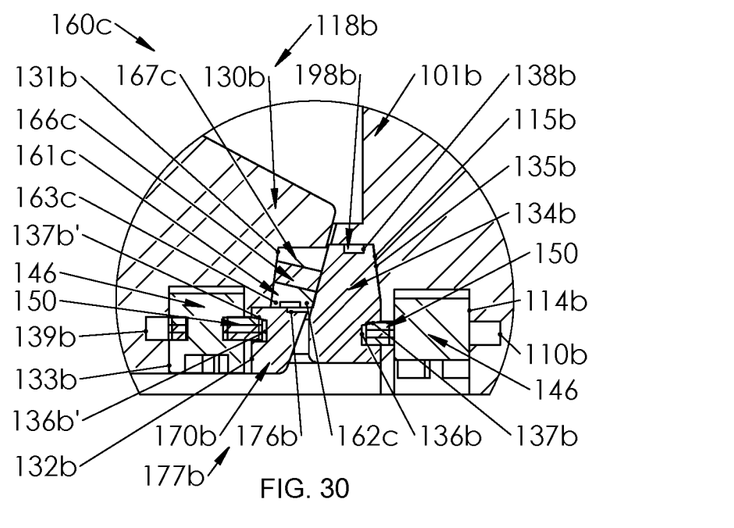
FIG. 30 is a "D" detail view of the rotary valve of FIG. 29.
Figures 31, 32:
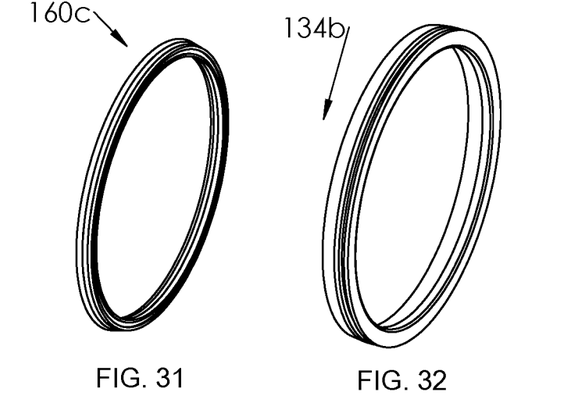
FIG. 31 is an isometric view of an alternative seat assembly of FIG. 28
FIG. 32 is an isometric view of an alternative solid seat assembly of FIG. 28.
Figure 33:
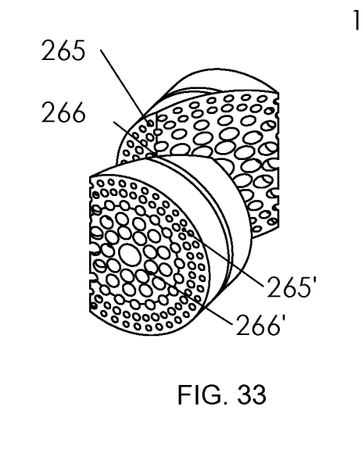
FIG. 33 is an isometric view of a pair of trims.
Figure 34:
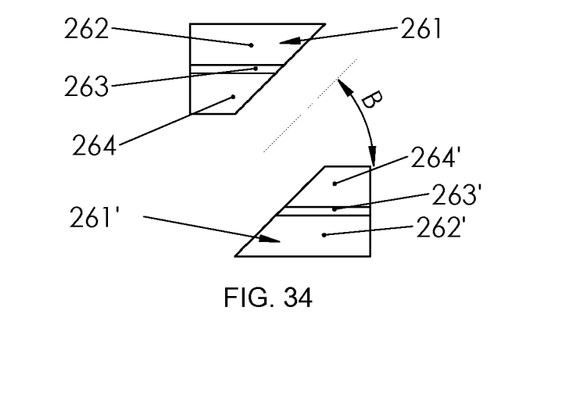
FIG. 34 is a top view of the pair of trims of FIG. 33.
Figures 35, 36, 37, 38, 39, 41, 42:
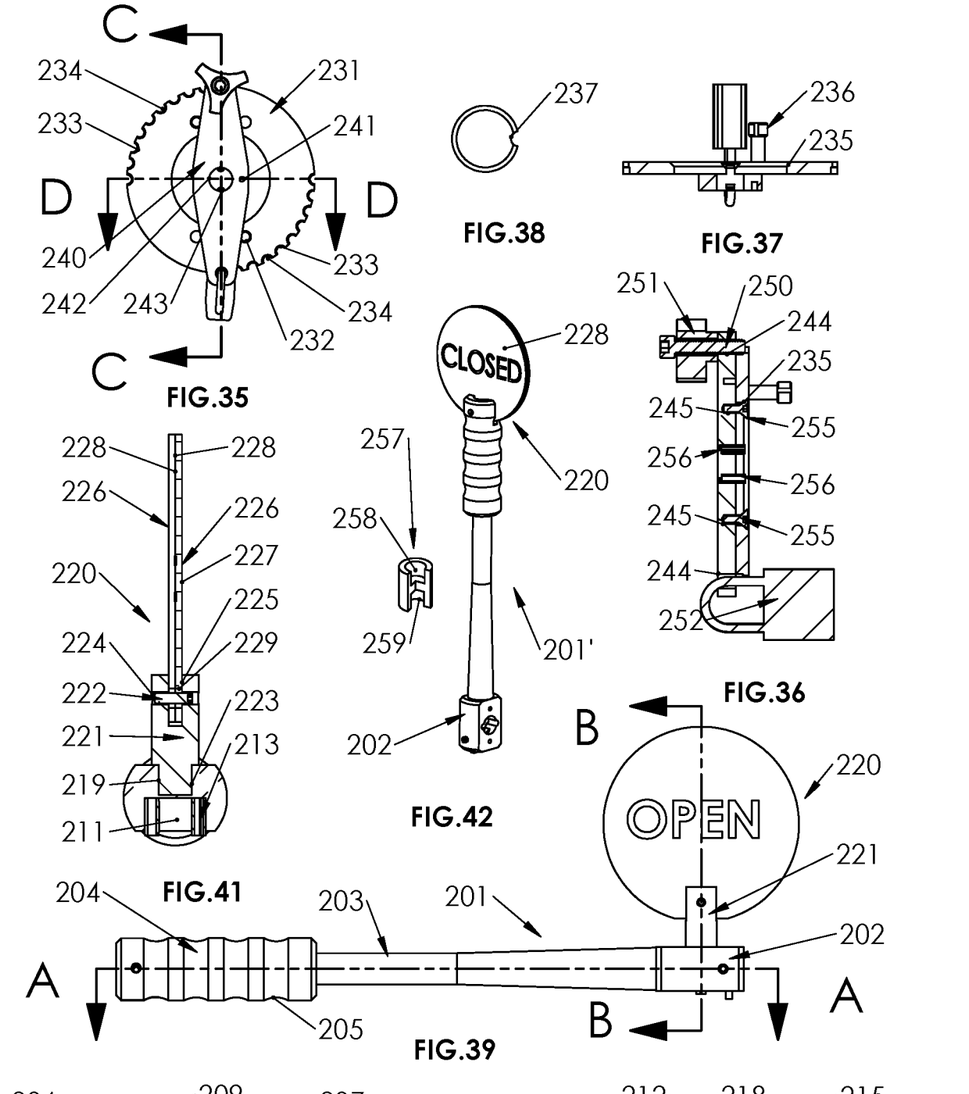
FIG. 35 is a top view of the handle positioner assembly of FIG. 1.
FIG. 36 is a cross sectional view of the handle positioner of FIG. 35 along line C-C.
FIG. 37 is a cross sectional views of the handle positioner of FIG. 35 along line D-D.
FIG. 38 is a top view of the screw of FIG. 37.
FIG. 39 is a front view of the handle assembly of FIG. 1.
FIG. 41 is a cross sectional view of the handle assembly of FIG. 39 along line B-B.
FIG. 42 is an isometric view of an alternative handle assembly of FIG. 39.
Figure 40:
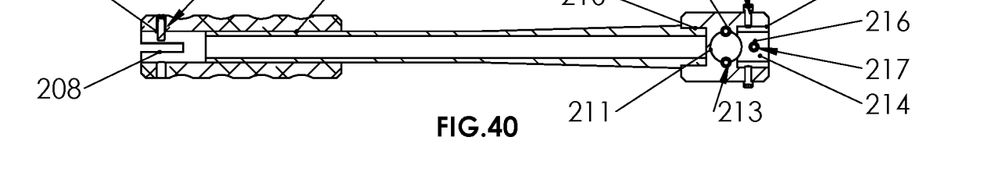
FIG. 40 is a cross sectional views of the handle assembly of FIG. 39 along line A-A.

Referring FIGS. 33 to 34, a pair of trims 260 has a left trim 261 and a right trim 261' cut by angle B between 0-90 from one part 260, installed in the front side and back side of the valve body assembly 101 for conditioning fluids through the valve 100, especially for exhaust gas, the trim 261 has sections 262, 263, 264, sections of 262, 364 have an internal layer 266 and an external layer 265, section 262 with catalytic coatings for reduction or oxidation or both, section 262 for filtering or as a mutual section, section 264 with catalytic coatings for oxidation or reduction or both, the trim 261' has sections 262', 263', 264', sections 262', 264' have an internal layer 266' and an external layer 265', section 262' with catalytic coatings for oxidation or reduction or both, section 262 for filtering or as a mutual section, section 264 with catalyst coatings for reduction or oxidation or both, since the valve 100 control flow rate between 0-90 degrees, so it will reduce CO and NOx gas from exhaust gas more efficiently, safer than the conventional catalytic converter, the conventional catalytic converter has a fixed area for catalytic process regardless of flow rate or high back pressure.

Referring FIGS. 1, 35 to 42, the handle positioner assembly 230 has a positioner plate 231, a rotor bar 240, a cap screw 250, nut 251, two flat screws 255, two anti-tampering screw 236, two spring pins 256 and a lock 252, the position plate 231 has two set of 10 step round, concentric slots 233, 234 on an opposite direction, four holes 232 for installing with the valve 101 and a large chamfer 235, the rotor bar 240 has a stem bore 242 with two pin slots 243 to respectively receive the spring pin 256, two thread hole 245 respectively to receive flat screw 255 over the chamfer 235 of position plate 231 for preventing the rotor bar 241 from moving up and down but allowing it to rotate, since the screws 255 are inserted from bottom of the position plate 231, it is safe from tampering, the rotor bar 240 also two thread holes 244 on both ends to receive the cap screw 250 and lock 252, since lock 252 with a small shackle can go through the slots 234, while cap screw 250 with larger diameter stop at slot 233, so the rotor bar 240 can be positioned by redundant methods with the locker 252 and cap screw 250 at the time, while nut 251 is used to prevent the screw 250 from losing due to vibrations, the handle positioner assembly 230 is placed on top of the valve 101 secured by anti-tampering screw 236 into the thread holes 232, since the screw 236 with a slot 237 is not a standard screw, the special tool is need to remove the screw 236 as an additional safety measure, finally stem 120 placed in stem hole 242 is coupled with two spring pins 265, while slots 243 are not through, two spring pins 265 cannot be removed from top of the stem 120, the handle positioner assembly 230 along can secure any position of the stem 120 without the handle assembly 201, so the handle assembly 201 is detachable.

The handle operator assembly 201 has a handle head 202, a handle bar 203 and grip 294 and an indicator assembly 220, the handle head 202 has a vertical stem hole 211 with two pin slots 212 and a horizontal stem hole 214 with two pin slots 215, a handle bar bore 210 to receive the handle bar 203, a top hole 213 to receive the indicator assembly 220, the grip 204 has four grooves 205 to fit the human hand profile and a bore 207 and slot 208 to receive handle bar 203 as well as the indicator assembly 220, the indicator assembly 220 has a base 221 and two display plates 226 and screw 222, the base 221 coupled with the handle head 202 has a slot 225 to receive two display plates 226 and a thread hole 229, the display plate 226 has two sides with "OPEN" and "CLOSED" and hole 225, screw 222 is threaded into hole 229 and holes 225 of display plates 226 to secure the display plates 226, the two display plates 226 show the same sign, "OPEN" or "CLOSED", the screws 217 is attached to thread hole 241 of rotor bar 240, after operations, the handle assembly 201' can be installed at a vertical position by the vertical stem bore 214 and secured by screw 218 for saving operation spaces or displaying a valve operation condition from a distance, an adapter 257 is used for coupling between the valve 101 and positioner without handle.

Advantages

1. Reliability. (1) High operational reliability is based on the closure member which is coupled with the stem during operation (a) by two balanced wedge-key and setscrew between the disc and stem at the middle position without stress concentration or destructive features like pin hole and keyway (b) three spring bearings compensate any deformation of the stem under load and absorber any impact load on the stem and reduce the stress (c) the wedge-spring joint/lock device between disc and solid seat assembly (c) the wedge-eccentric-thread joint/lock device between retaining ring and seat is designed to hold the seal rings evenly and securely, there is an interlock function between lock ring and lock plug, the lock plugs will not fall into the flow port if the lock ring is broken or loosen up (2) high sealing reliability is based on (a) the wedge seal rings, each metal wedge seal ring has independent outward and inward seals, seal force is self-balanced without preload, side load or side seal (b) Cool joint on solid seat assembly has no welding deformation or crack issues and has inward and outward seal surfaces and self-energized lock plug assembly to secure the solid seat assembly either with the disc or body, the solid ring is much robust than any coating or no welding or thermal spray between the ring and base materials (3) the redundancy for the seal system can be 2 to 6 as number of seal ring and packing increase, so it can be used for critical applications like jet, turbine engines air throttling or subsea flow controlling, there is no valve ever developed which has such a high level of reliability like this valve in this invention
2. Sealability. This crossover valve offers the best sealing performance over triple offset, double offset and metal or nonmetal seal valves, under 500 F, the composite wedge seat assembly with PTFE and metal rings have the best performance over all existing engineering plastics in term of sealing durability and robustness, while over 500 F, the metal lamented ring assembly complete eliminate all graphite element and provides the best metal to metal sealing over all existing metal to metal seats, it not only provides sealing under high temperature, but also stand high impact closing force due to shock absorbing the front and back rings along with the stop pin with the buckling groove, this valve can be fully metal-sealed in both static and dynamic manners with ANSI Class VI leakage or bubble tight seal between ANSI class 150-4500, there is no temperature barrier or limit by seal materials like graphite, the seal capacity can take on working temperature between −450 F to 1450 F or with highly oxidative fluid or fluid with solid particles, while stem leakage can be between 3-50 ppm with seal ring fine surface 16 RMS or special coatings gold, silver and nickel, since the seal assembly in the valve is self-energized, compensated and pressure assistant seal, the all seal materials can be the same, there is no constant local adjustment for the whole valve.

3. Durability. It is related to four wearing compensation factors between the two parts (1) the metal spring bearings compensate any wearing between stem and bearing and absorber impact force due to opening and closing and prolongs life of stem (2) the wedge seal ring assembly acts as a disc spring to store torsion energy when it is approached to closed position and release torsion energy when it is approached to open position, as result the wearing and tearing due to the friction can be further reduced, the operating torque is only 50 to 65% of conventional metal butterfly operating torque, moreover the back ring with a back groove can be compressed in radial and axial directions unlike conventional single seat ball valve or triple offset butterfly, while the front ring come with a lip and leg can compensate axial deformation if the pressure come from downstream unlike the single seat ball valve or triple offset butterfly valve, under the wedge seat assembly acts as a self-balanced spring to compensate any wearing on the inward surface or outward surface within a limitedly known range of torque, while conventional metal seal butterfly or ball valves act as an energy dissipater both in closing and opening processes, so the torsion energy cannot be destroy or created, so the energy become heat and damages the seat in both closing and opening by forms of friction and heat, in meanwhile, all seals and spring bearing are self-energized to compensate any wearing (4) non-backlash key joint between the stem and disc not only eliminates any wearing between them, but also secure lock position with interlock, back entry setscrews by penetrating into disc keyway even under high operation cycles or thermal cycles, the falling proof mechanisms for both key and setscrews disrupt all current valve joint design, finally the stop pin with the buckling groove stock 35% closing impact energy and release it when the valve is to open, as a result, the life of the seat and seal ring assembly is prolonged, with all benefits of the invention, the valve can last 5 to 30 years without replacement or readjustment and away beyond any existing valve life in the valve industries.

4. Usability. The solid seat assembly, retaining ring assembly and the wedge seal ring assembly can be used for most valves like butterfly, ball and check and gate valves, temperature range for the valves is from −425 F to 1600 F, the valves with the features can be used for handling fluids cover from air, water, oil to fluid with solid particles or slurry fluid, moreover they are filed repairable, the wedge seal ring assembly and solid seat have various material selections from metal to nonmetals or between, which includes composite materials, full metal materials and metal and nonmetals based on the fluid conditions unlike conventional valves, which have not interchangeable between metal to metal seal and metal to nonmetal seal, while stem packing assembly can be used for both rotary valves and non-rotary valves as well as pump shaft seal, it makes the actuation job much easily without bracket and adapter, finally the detachable, singing handle operator assembly can be used for various valves and save lots spaces even in very limited room or space.

CONCLUSION, RAMIFICATIONS AND SCOPE

The present invention provides a revolutionary solution for all sealing problems on rotary valve, the crossover rotary valves with the wedge seat assembly against solid ring assembly in this invention finally solve the metal to metal seal problem, it complete changes the conventional rotary metal seal, there are three distinguish differences between the conventional laminated seat and the solid ring (a) the wedge seal ring assembly completely eliminates graphite and the glue, so it breaks the temperature limit beyond 850 F for both dynamic and static seals, especially in jet or rocket engine applications where it is used for throttling high temperature, highly oxidative flows (b) each wedge seal ring has a balanced, independent inward and outward seals and act as a reverse disc spring, it store and release torsion energy unlike the conventional triple offset butterfly valve as an energy dissipater, it not only reduces the torque by 40% and wearing, but increase life of the seal ring, while the conventional laminated seat has metal rings glued with graphite rings together and only one layer first or last to prevent leak in inward or outward seal seals, if the seal layer leaks, the whole seat will leak, while each wedge seal ring has independent seals, the wedge seal ring can be flexible to good static seals, so it can be used for both throttling and shutoff (c) the wedge seal ring assembly has a front groove and back groove surfaces without pre-side load and side seals, so any open or closed operation will not generate much friction or heat between the wedge seal rings, such feature greatly increase the sealability as well as the life, the four different types of wedge seat assembly play different roles in different applications, the composite seat (nonmetal/metal/nonmetal) to 500 F has the widest range applications with low cost and is simply made, the laminate metal seat assembly (metal/metal/metal) is used for most challenging applications or multiple severe services, like high temperature with high pressure, high temperature with solid particles, the laminate seat assembly (metal/nonmetal/metal) is an improved conventional laminate seat, the key difference is the improved conventional laminate seat has the glue placed among metal rings, external ring and internal ring, while conventional laminate seat has the glue placed between the metal ring and nonmetal (graphite ring), so no matter how strong the thermal strength of the glue, the weakest link is the graphite, finally the valve with seal assembly in this invention can compete against conventional gate valve at high pressure/temperature applications and severe service, while both gate and ball valve still struggled with unsolvable rubbing problem and tough metal seal issues for special applications where constant replacement of seat is impracticable like subsea devices, nuclear power plants. Finally, wedge seat assembly and solid seal ring assembly can installed on both the disc and the body, so the replacement in the field become possible, much cheap and easy even under most severe conditions, the seals for the seat assembly comply with the ANSI class VI leakage and can last 5 to 30 years, because the outward and inward surface seals are counter-balanced under compression, when the wedge seat at a closed position, the seal force is balanced by inward and outward surfaces and provide seal forces for both surfaces without preloading, when wedge seat at open position is not under compression, there is no seal need, so any closed operation is about 90% energy stored through flexible wedge rings, about 10% energy dissipated as heat through friction, while the seal force in the conventional triple offset valves is unbalanced, 90% energy of seal operation against the preloaded side seal forces is dissipated as heat and separation particles of graphite, while 10% energy for seal operation is stored in "resilient seat".

The present invention provides a long sought solution—a novel wedge-eccentric—spring plug joint/lock mechanism to two fundamental problems; one is bolting joint between the seat assembly and the retaining ring assembly, other is key/pin joint between stem and disc in the conventional valve (a) This wedge-eccentric-spring plug joint/lock mechanism completely change the way of joint/lock between the seat and the retaining ring assembly (1) the retaining ring assembly, the retaining ring assembly in this invention has smaller ring without interfacing with flange gasket seal and only need 3 or 4 plugs, moreover it not only reduces the machining time and parts, risk of number of un-tighten bolts, but increase contact area about 3 to 4 times and the reliability of the joint by evenly distributing compression force on the retaining ring, while the conventional retaining ring needed 4 to 36 of bolts for securing the retaining ring, all conventional retaining rings are very large and interfaced with flange gasket seal and weak the seals, so API 609 specification has a special requirement for retaining ring design, (2) retaining ring assembly locking mechanism, the retaining ring assembly in this invention has the irreversible, redundant, independent wedge-eccentrics spring/plug mechanism is to replace reversible, multiple, non-independent bolting join/lock mechanism, each wedge-spring plug locking mechanism is operated by a chain of function of spring washer for preventing rotation of lock plugs, the friction amplified by special surface textures or coatings between the lock plug hole and lock plug for preventing rotation of lock plugs, the wedge engagement with self-lock angle between spring washers and groove of the body or disc for preventing radial inward movement, moreover the setscrew in radial holes are radially to secure the retainer even a failure of one of the wedge-eccentric-spring/plug mechanisms will happen, so any failure of wedge-eccentric spring/plug mechanisms against the seat assembly has to be accomplished by a series of events of loosened setscrew, rotation of lock plug, inwardly radial movement of lock ring at the same time, but such a possibility is next to zero, with such high reliability, the valve can be used even under multiple extreme conditions such as a high vibration and high temperature like turbine engine applications due to different natures between wedge and eccentric mechanisms.

(b) This wedge-key/screw joint/lock mechanism provides other solution for joint between stem and disc, with the middle balanced keyways on the disc and two wedge keys on the stem, the wedge key joint evenly distributes the loading between hubs as compression, because of the wedge engagement between stem and keys, the stem no longer has high stress concentration, the clearance between stem and keys become one dimension unlike conventional keyway with two clearance in X and Y dimensions, the setscrews inserted into the wedge key eliminate the clearance between stem keyways and keys to prevent loss motion and backlash, which is very important for automation control, in term of manufacturing process, cross milling the wedges on the stem is much easier and lower cost than the broaching or position milling keyway on the stem, moreover, setscrew in the key will not fall in a pipeline system even under a loosened condition, because the top hole of key is smaller than the setscrew diameter, the load under pressure is shifted from the disc hubs and stem hub joint in the conventional butterfly valve to the center strong section of the disc and the stem, with the self-lock angles, friction amplified texture surfaces and anti-loose screws, moreover the setscrew can be penetrated into the keyway under press or a dent of the keyway for preventing any up and down movements between the stem and disc.

The invention provides a breakthrough stem seal concept, the wedge packing assembly, it converts a dynamic axial force to dynamic radial forces to secure stem seal in the most effective and efficient way, the conventional valves have a large gland, large bolts and need excessive load on the graphite stem packing or with living load with two sets of disc springs, according to Hook law and Poisson ratio, for graphite, the Poisson ratio is near zero, it means almost zero of axial forces is converted to radial force to help stem seal, the industrial graphite packing tests indicate that only the top three rings of 5 rings of stem packing has real seal function, in contrary for the wedge packing assembly in this invention, every set ring acts as a full function seal ring, each set of rings with the metal wedge rings and metal support ring, this packing ring is subject to Newton third law (action and reaction), in addition, each of the support rings and wedge rings become of a part of the stem seal element and a part of compression volume of graphite packing to replace the conventional, external live-loading, so no compression forces or energy are wasted, it also improves packing performance by increasing PTFE holding pressure by 35% even under 500 F and graphite holding pressure under 1100 F and the graphite fugitive emissions level is kept under 50 ppm or lower even high cycle, finally with the stem with shoulder, the first graphite—less packing become reality, the top full metal packing and full metal packing on the shoulder can stand for working temperature over 1500 F with highly oxidative fluids.

Other problem the invention solves is bidirectional seal, many triple or double offset butterfly or single seat ball valve makers claim that their valves are bidirectional seal, but both sides (upstream and downstream) hold different pressures, but in this invention, with the spring bearings and wedge seal ring assembly, the valve can hold the same pressure from both upstream and downstream, because the stem bearings, the key joint between stem and disc not only eliminate clearance between the stem and bearing and disc stem hole and stem, but also has spring function to hold the pressure, while the wedge seal ring assembly provides radial and axial compensation even the disc tends to move away from seat under pressure.

The left and right trims in this invention provides a simple, low cost, flexible and effective solution, it comprises a segment cylindrical bar having multiple holes, internal mating surface and flow port, they can be used either for retrofit with additional flanges, where exhaust gas has high contents of CO and NOx gases, so the trims not only condition the flow, but also reduce CO and NOx gases through catalytic converter as a part of the trims and filet out poison dusts.

Finally the detachable, signing handle operator assembly is other novel feature, the handle operator assembly not only save the life of first responders because of clear signing plates which indicate each valve operation condition, location, but also million dollar properties in emergencies like fire and gas leak, in addition the detachable handle greatly improve the manual operated valves performances in limited space applications like offshore platform, marine applications, although some detachable hands are used on the fields, most of them are often misplaced after detaching from the valve, the invention resolves the issue with the vertical hole and an sign indicator, just one stone for two birds. Finally the handle operator assembly is based on modulation, so few parts covers various size valves, it not only reduces the manufacturing cost, but improve safety and security.

Although the description above contains many specifications, these should not be construed as limiting the scope of the invention but as merely providing illustration of some of the presently preferred embodiments of this invention.

Thus, the scope of the invention should be determined by the appended claims and their legal equivalents, rather than by the examples given.

I claim:

1. A fluid related device includes a body assembly having a flow port defined by a an axis X, a closure member assembly defined by a rotary axis Z and an axis Y, an Offset X from said axis X disposed in said body assembly and a sealing assembly disposed between said body assembly and said closure member assembly, said sealing assembly has a replaceable seat assembly, a seat recess receiving said replaceable seat assembly, a seal ring recess, and a wedge seal ring assembly disposed in said seal ring recess and engaged with said replaceable seat assembly for providing seals at closed positions, said fluid related device also has a stem seal assembly disposed between said body assembly and said closure member assembly for seals, said sealing assembly is defined by said offset X and an offset Y from said axis Z and has a seal engagement defined by a spherical solid surface and conical laminated ring surfaces for providing pulse dynamic line seals; (a) said replaceable seat assembly has at least two spring plug assemblies, a seal gasket, a seat having said spherical surface and a conical surface with a conical lock groove and a back surface with a seal groove, said seat recces has at least two plug bores respectively extending to said seat through at least two openings, each of the at least two spring plug assemblies respectively disposed in each of the least two plug bores has a plug having two slots and a set of spring washers having a notch receiving said plug through said slots and the at least two openings, said set of spring washers is engaged with said conical lock groove and rotated for increasing compression of said set of spring washers to secure said seat against said seat recess, said gasket is disposed between said seat recess and said seal groove of said seat for providing secondary seals; (b) said wedge seal ring assembly has a front flexible ring assembly and a middle rigid ring assembly and a back flexible ring assembly for providing radically differential seals, said front flexible ring assembly is provided for filling any gap between said seat assembly and said wedge seal ring assembly, and for providing upstream seal, responding to any radial disengagement, and absorbing impact force, said back flexible ring assembly is provided for filling any gap between said seat assembly and said wedge seal ring assembly, and for providing downstream seals, responding to any radial disengagement, and absorbing impact force, while said middle rigid ring assembly is provided for holding seals under both upstream pressure and downstream pressure, and minimizing any radial disengagement, said seal ring recess has a conical lock groove, said wedge seal ring assembly also has a spring plug/screw lock retainer assembly, said spring plug/screw lock retainer assembly has at least two setscrews, a retainer ring having a groove and at least two radial thread holes respectively expanding to a smaller operation hole, the at least two plug bores, and the at least two spring plug assemblies, each of the at least two setscrews is threaded in each of the at least two radial thread holes to engaged with said conical groove to secure said wedge seal ring assembly against said seal ring recess, each of the at least two spring plug assemblies respectively disposed in each of the at least two plug bores to engaged with said conical groove to secure said wedge seal ring assembly against said seal ring recess.

2. The device of claim 1, wherein said wedge seal ring assembly has one of a plurality of structures (a) a first structure has said middle rigid ring assembly having at least one middle rigid wedge ring having an angle between 0-90 degree, said back flexible ring assembly having a flexible back ring having a mated surface engaged with the at least one middle rigid wedge ring, said front flexible ring assembly having a flexible front ring having a lip, a mated surface engaged with the at least one middle rigid wedge ring (b) a second structure has said middle rigid ring assembly having the at least one middle metallic wedge ring-having said angle between 0-90 degree said back flexible ring assembly having a metallic back ring having said mated surface engaged with the at least one middle metallic wedge ring and at least one groove for absorbing impact force and compensating wearing, said front flexible ring assembly having a metallic front ring having said mated surface engaged with the at least one middle metallic wedge ring, a lip and a leg for absorbing impact force and compensating axial displacement and wearing (c) a third structure has said front flexible ring assembly having said metallic front ring, said back flexible ring assembly having said metallic back ring and said middle rigid ring assembly having the at least one middle ring assembly having an external ring, an internal ring and glues jointed among said external ring, said internal ring and said metallic front ring and said metallic back ring (d) a fourth structure has said front flexible ring assembly having said metallic ring and a glued ring with said external ring, a glue, said internal ring, said back flexible ring assembly having said metallic ring and a glued ring with said external ring, said internal ring, said glues jointed, said middle rigid ring assembly having a metallic ring glued between said back flexible ring assembly and said front flexible ring assembly (e) a fifth structure has said front flexible ring assembly having (N>1) number of said metallic rings and (N>1) number of glued rings with said external ring, said glue, said internal ring, said back flexible ring assembly having (N>1) number of said metallic rings and (N>1) number of glued rings with said external ring, said glue, said internal ring, said middle rigid ring assembly having said metallic ring glued between said back flexible ring assembly and said front flexible ring assembly.

3. The device of claim 1, wherein said body assembly includes a packing bore extending to a stem hole filled with sealants and a retaining groove, said stem seal assembly having a stem bearing assembly and a stem packing assembly disposed in said packing bore, a retainer ring disposed in said retaining groove for holding said stem packing assembly, said closures member assembly has a stem receiving said stem seal assembly, said stem has one of plurality of structures including a round bar without a shoulder and a round bar with said shoulder, said shoulder has two axial surfaces, said stem bearing assembly has at least two pins, a bearing and two setscrews, said bearing has a stem bore having at least two pin slots respectively receiving each of the at least two pins for holding said stem at a center position and two conical bores to respectively receive said setscrews for controlling said bearing position, said stem packing assembly has a plurality of arrangements:

(1) a first arrangement disposed between said packing bore and said stem with said shoulder has at least two straight packing assemblies and two shoulder packing assemblies, each of said straight packing assemblies has one of a plurality of configurations (a) a first configuration has an external flexible ring having a conical internal surface, an internal, flexible ring having a stem bore to receive said stem, an external, mated surface engaged with said conical surface of said external surface and a metallic support ring having a plurality of shapes including flat shapes and curve shapes (b) a second configuration has at least one middle metallic ring having said angle between 0-90 degree, said external, flexible ring disposed in said packing bore having said mated surface engaged with the at least one middle metallic ring, and said internal, flexible ring having said stem bore to receive said stem and said external, mated surface engaged with the at least one middle metallic ring and said metallic support ring having one of plurality of shapes including flat shapes and curve shapes, and each of said shoulder packing assemblies has the at least one middle metallic ring having said angle between 0-90 degree and an axial mated surface engaged with said axial surface of said shoulder of said stem, said external ring disposed in said packing bore having said mated surface engaged with the at least one middle metallic ring and said axial mated surface engaged with said axial surface of said shoulder, and said internal, flexible ring having said stem bore to receive said stem and said mated external surface engaged with the at least one middle ring, said axial mated surface engaged with said axial surface of said shoulder and a said metallic support ring (2) a second arrangement disposed between said packing bore and said stem without said shoulder has the at least two straight packing assemblies.

4. The device of claim 3, wherein said body assembly includes at least two body bearing assemblies disposed in said stem hole, each of said body bearing assemblies has at least two pins, seal ring, a bearing having at least two slots respectively receiving said pins for holding said stem at a center position, said bearing also has a sealing groove to receive said seal ring for providing seals between said bearing and said stem hole and a stem bore receiving said stem, said stem bore has multiple seal teeth engaged with said stem for holding seal greases and providing seals between said bearing and said stem.

5. The device of claim 3, wherein said body assembly includes a stop pin, at least two body bearing assemblies disposed in said stem hole and a stop pin hole to receiving said stop pin for stopping said disc overdrive, each of said body bearing assemblies has at least two pins, seal ring, a bearing having at least two slots respectively receiving said pins for holding said stem at a center position, said bearing also has a sealing groove to receive said seal ring for providing seals between said bearing and said stem hole and a stem bore receiving said stem, said stem bore has multiple seal teeth engaged with said stem for holding seal greases and providing seals between said bearing and said stem, said stop has a buckling groove to absorb closing impact of said closure member assembly under buckling conditions.

6. The device of claim 1, wherein said closure member assembly has said closure member, a stem and two key assemblies, said closure member has a upper hub with stem hole and a lower hub having a stem hole, a left keyway and a right keyway, said stem having two horizontal, non-parallel, wedge slots is inserted into said hubs, each of said key assemblies disposed respectively between said left keyway and a first of said two horizontal, non-parallel slots said right keyway, between said right keyway and a second of said two horizontal, non-parallel slots has a key having a thread hole extending to a smaller hole, a setscrew inserted in said thread hole, said key has an outward mated surface engaged with one of said left keyway and said right keyway and an inward surface engaged with one of said two horizontal, non-parallel, wedge slots for transferring movements between said stem and said closure member, said setscrew is threaded down into said keyway and penetrated into said keyway under press for eliminating any gap between said disc and said stem, preventing up and down movements between said closure member and said stem.

7. The device of claim 1, wherein said body assembly includes a pair of complementary trims assemblies respectively positioned in a front and back of said closures member assembly in said flow port of said body assembly, said pair of trims having a left trim and a right trim, said left trim having a left external, partially cylindrical surface, a back surface, a right surface and a front surface defined by a rotary profile of said closure member and multiple through-holes between said front and back surfaces, said right trim having a right external, partially cylindrical surface, a back surface, a right-surface and a front surface defined by said rotary profile of said closure member and multiple through-holes between said front and back surfaces, each of said trims has at least one layer of catalytic converting sections and at least one layer of filter sections for high temperature combustion and for preventing NOx pollution, carbon monoxide and dust under the clean air regulations, a method of making said pair of complementary trims assemblies is defined by (1) making a metal front cylinder ring with said multiple through holes, a metal back cylinder ring with said multiple through holes, a first middle cylindrical ring of said catalytic converting section, a second middle cylindrical ring of said filter section, (2) assemble said metal front cylinder ring, said first middle cylindrical ring of said catalytic converting section, said second middle cylindrical ring of said filter section, said metal back cylinder ring as one unit by one of plurality of ways including welding bolting and gluing (3) cut said unit into said left trim and said right trim with an angle between 10 to 45 degree by one of plurality of ways including a water jet cutter and a laser cutter and saw cutter.

8. The device of claim 1, wherein said device includes a handle operator assembly disposed on a top of said body assembly and coupled with said closure member assembly, said handle operator assembly has a position assembly and a handle assembly, said position assembly attached with said body assembly has a position plate having a pair of group position step slots away from each other and at least two thread holes and a stem hole, a bottom chamfer, and a lock bar disposed on said position plate, said group position step slots are defined by multiple step slots, said step slot has a top slot extending to a smaller bottom slot, said lock bar coupled with said stem by two spring pins has two position thread holes and two lock thread holes, said position assembly has two flat screw respectively disposed between said chamber of said position plate and said thread hole of said lock bar for preventing separation between said lock bar and said position plate and at least one positioner, said positioner has one of plurality of structures including a screw/nut assembly positioning at said top slot and a locker through said slots for holding a position, said position assembly has at least two anti-tamping screws, each of said screws has a head with a drive notch through said body assembly into said thread hole of said position plate, said handle assembly has a head, a handle connected with said head, a gripper connected with said handle and an indicating plate assembly, said head has at least two stem bores respectively coupled with said stem by two pins and a handle bore connected with said handle and a holding slot with a lock thread hole, said gripper has four hand match grooves and a holding slot having a screw hole for holding said indicating plate assembly, said indicating plate assembly disposed in one of said holding slots has at least one indicating plate having a hole and a screw inserted through said lock thread hole of said holding slot.

* * * * *